(12) United States Patent
Parulski et al.

(10) Patent No.: US 7,038,714 B1
(45) Date of Patent: May 2, 2006

(54) PRINTING SYSTEM AND METHOD HAVING A DIGITAL PRINTER THAT USES A DIGITAL CAMERA IMAGE DISPLAY

(75) Inventors: Kenneth A. Parulski, Rochester, NY (US); Nathan J. Romano, Rochester, NY (US); Ronald J. Perry, Webster, NY (US); Keith Hadley, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/571,928

(22) Filed: May 16, 2000

(51) Int. Cl.
*H04N 5/225* (2006.01)

(52) U.S. Cl. ............................... 348/207.2; 348/211.14

(58) Field of Classification Search ............ 348/211.14, 348/207.2, 211.4
See application file for complete search history.

(56) References Cited

U.S. PATENT DOCUMENTS

| | | | | |
|---|---|---|---|---|
| 4,937,676 A | * | 6/1990 | Finelli et al. | ................ 348/375 |
| 5,047,864 A | * | 9/1991 | Fujito | ......................... 358/296 |
| 5,164,831 A | | 11/1992 | Kuchta et al. | |
| 5,477,264 A | | 12/1995 | Sarbadhikari et al. | |
| 5,606,420 A | | 2/1997 | Maeda et al. | |
| 5,969,750 A | * | 10/1999 | Hsieh et al. | ................ 348/14.1 |
| 6,115,137 A | | 9/2000 | Ozawa et al. | |
| 6,259,469 B1 | * | 7/2001 | Ejima et al. | .............. 348/14.01 |
| 6,356,357 B1 | * | 3/2002 | Anderson et al. | ........... 358/1.17 |
| 2002/0067496 A1 | * | 6/2002 | Nishikata et al. | ........... 358/1.13 |
| 2002/0113996 A1 | | 8/2002 | Minakuti | |
| 2003/0156200 A1 | * | 8/2003 | Romano et al. | ........ 348/207.99 |
| 2003/0197894 A1 | * | 10/2003 | Miyamoto et al. | .......... 358/1.18 |

FOREIGN PATENT DOCUMENTS

| | | |
|---|---|---|
| EP | 0 382 044 A | 8/1990 |
| EP | 0 869 656 A | 10/1998 |
| EP | 0 920 184 A | 6/1999 |
| EP | 0 949 804 | 10/1999 |
| EP | 0 973 321 A | 1/2000 |
| JP | WO 97/50243 | * 12/1997 |
| JP | 11 179998 | 10/1999 |
| WO | WO 97/50243 | 12/1997 |

OTHER PUBLICATIONS

International Electrotechnical Commission, IEC–61966–2–1: Multimedia Systems and Equipment; 1999.
Japan Electronic Industry Development Association; "Digital Still Camera Image File Format Standard"; JEIDA–49–1998.
CompactFlash Association; CF+ and CompactFlash Specification Revision 1.4; 1998–99.
Japan Electronic Industry Development Association; "Digital Still Camera Image File Format Standard"; JEIDA–49–1998.
CompactFlash Association; CF+ and CompactFlash Specification Revision 1.4; 1998–99.

* cited by examiner

*Primary Examiner*—Wendy R. Garber
*Assistant Examiner*—Nelson D. Hernandez
(74) *Attorney, Agent, or Firm*—David A. Novais (57) ABSTRACT

A digital photography system includes a digital camera and a digital printer. The digital camera includes an image display and the digital printer includes user interface controls to control the images displayed on the camera and to select images to be printed.

30 Claims, 12 Drawing Sheets

PRINTING SYSTEM AND METHOD HAVING A DIGITAL PRINTER THAT USES A DIGITAL CAMERA IMAGE DISPLAY

CROSS REFERENCE TO RELATED APPLICATIONS

Reference is made to commonly-assigned U.S. patent application Ser. No. 09/570,089 filed May 12, 2000, entitled "A COLOR DIGITAL PRINTER HAVING A GRAPHICAL USER INTERFACE FOR DISPLAYING AND SELECTING IMAGES FROM A DIGITAL STORAGE MEDIUM" to Romano et. al.

FIELD OF THE INVENTION

The present invention relates to a color digital photography system including a digital camera and a digital printer and, more particularly, a digital camera including an image display and a digital printer including user interface controls which control the image display on the digital camera to select images to be printed.

BACKGROUND OF THE INVENTION

Digital cameras and digital printers are available from the Eastman Kodak Company and many other suppliers. Current digital cameras, such as the Kodak DC280 camera, capture images with a single-chip color CCD image sensor, process the images to provide "finished" RGB images, compress the images using JPEG compression, and store the images on a removable memory card. The images can be reviewed on an LCD image display on the back of the camera, and unwanted images can be deleted.

The memory card can then be placed in a digital color printer, such as the Kodak Personal Picture Maker PM100. This printer includes memory card slots for the well-known Compact Flash and Smart Media Flash EPROM memory cards. The card is removed from the camera and placed in the printer. The printer includes a monochrome LCD status display and several buttons that serve as the user interface. These buttons enable the user to make one or more copies of all of the images on the memory card and to select various printer features. The prints are made using a color ink jet head which marks specially designed photo ink jet paper.

As described in commonly-assigned U.S. patent application Ser. No. 09/570,089 filed May 12, 2000, entitled "A COLOR DIGITAL PRINTER HAVING A GRAPHICAL USER INTERFACE FOR DISPLAYING AND SELECTING IMAGES FROM A DIGITAL STORAGE MEDIUM" to Romano et. al., a digital printer may include an image display, such as a color LCD, as part of a printer graphical user interface (GUI) to allow the user to select images to be printed. However, this means the digital photography system that a user must purchase includes an expensive color LCD in both the camera and printer. This increases the cost of the system.

What is needed is a printer GUI that allows the images to be easily selected for printing without requiring that the printer include an expensive color image display.

SUMMARY OF THE INVENTION

The present invention provides for a photography system that includes a digital camera and a digital or electronic printer. The digital photography system comprises a digital camera for capturing images and a digital printer for producing hardcopy prints. The camera includes an image sensor for capturing images; a memory for storing a plurality of captured images; and a display for displaying the stored images. The printer includes a marking apparatus adapted to provide images on a print; user controls for controlling the printer; and an electrical interface for controlling, from the printer, the images displayed on the display on the camera, for selecting an image to be printed from the plurality of digital images stored in the memory of the camera, and for transferring the selected image from the camera to the printer.

The present invention further provides for a printer adapted to produce hardcopy prints. The printer comprises an interface arrangement for connecting a digital camera including an image display to a printer, with the interface arrangement being adapted to transfer images stored in a digital memory, and the transferred images being viewable on a display screen of the digital camera connected to the printer; and user controls adapted to manipulate the images displayed on the digital camera when the digital camera is connected to the printer.

The present invention further provides for a method of producing prints. The method comprises the steps of electronically capturing images by way of an electronic camera; connecting the electronic camera to an electronic printer; using user controls on the electronic printer to control the images displayed on an image display provided by the digital camera; selecting, by using the user controls, a particular image to be printed using the image display provided by the digital camera; transferring the selected image to the printer; and printing the transferred image.

DETAILED DESCRIPTION OF THE INVENTION

Figure 1:
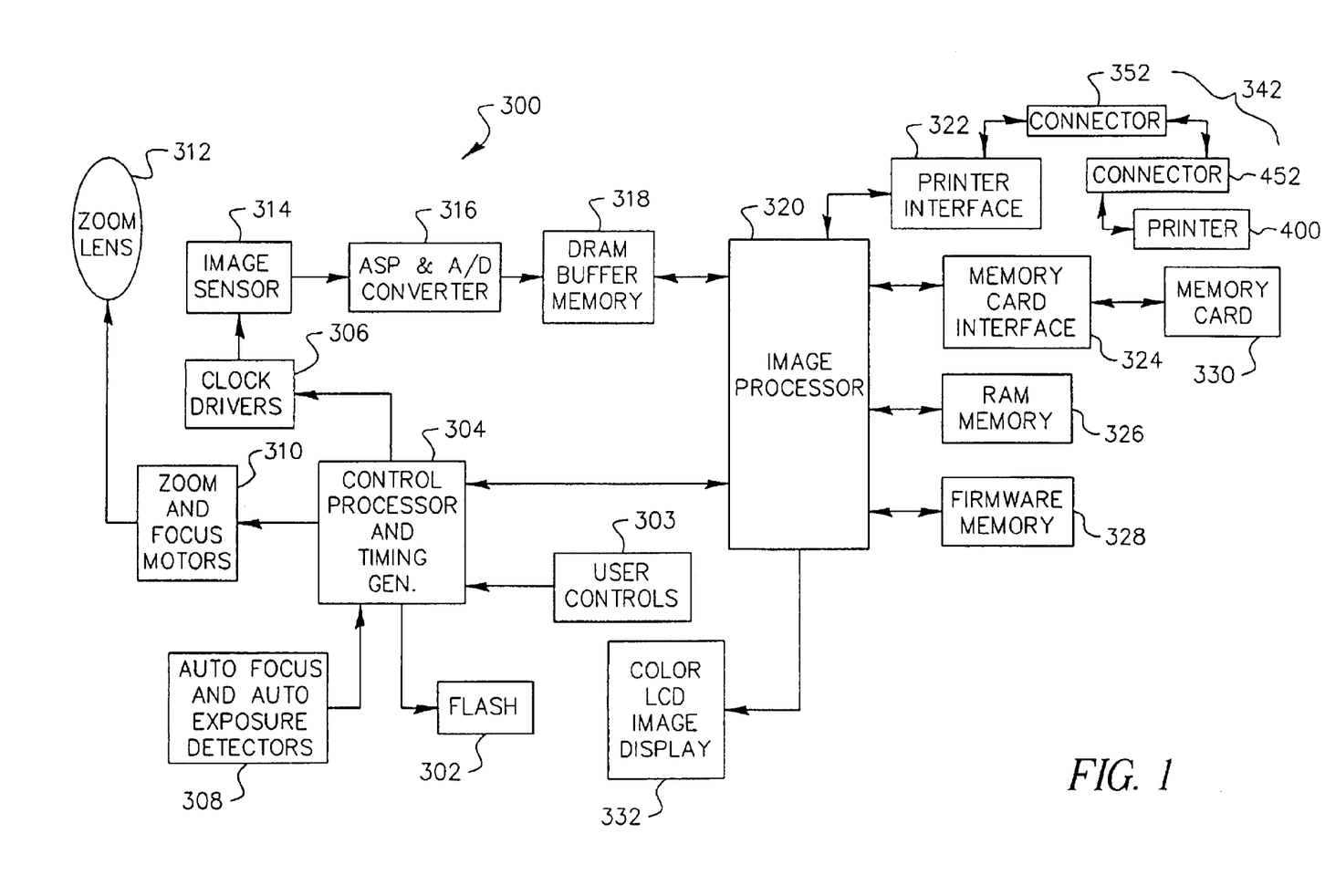
FIG. 1 depicts a block diagram of a digital camera that captures and stores images on a digital storage media and includes a color image display.
Figure 2:
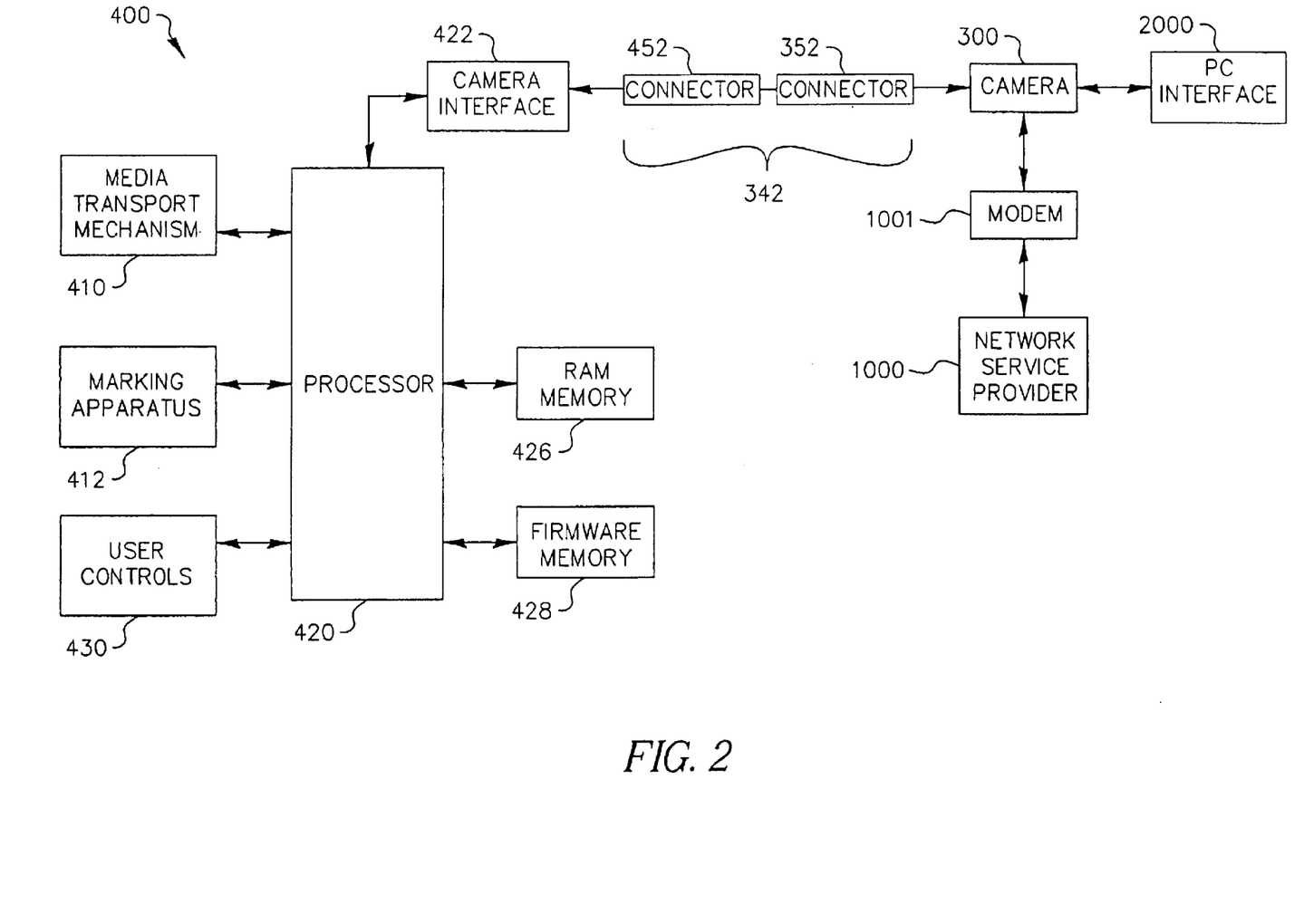
FIG. 2 depicts a block diagram of a digital printer having user controls for selecting images to be printed and which interfaces to the digital camera of FIG. 1 in order to control the images displayed on the camera color image display.
Figure 3A:
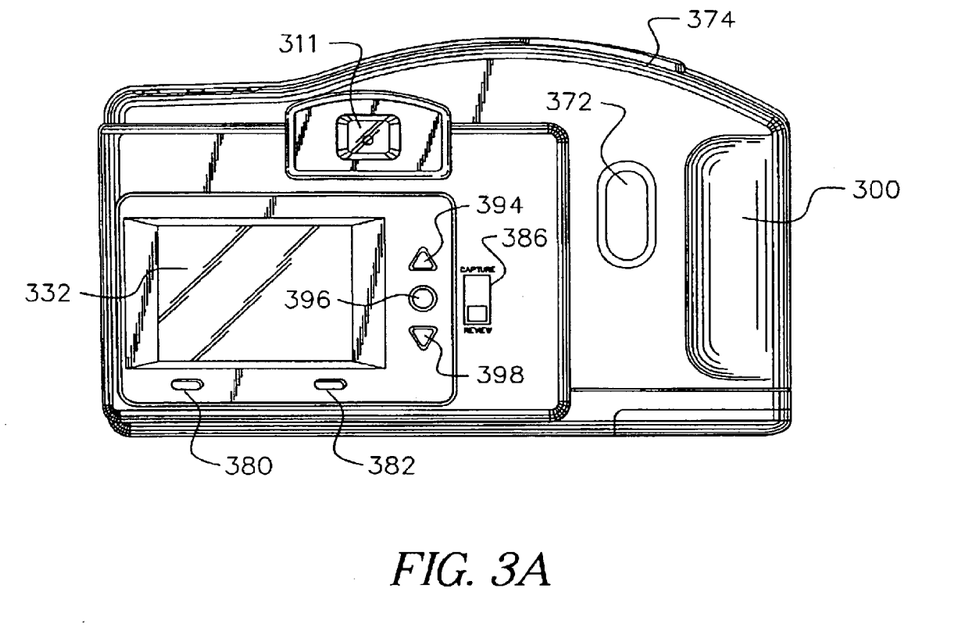
FIG. 3A depicts the rear view of an electronic camera.

Referring now to the drawings, wherein like reference numerals represent identical or corresponding parts throughout the several views, a digital camera 300 is depicted in FIG. 1 and FIG. 3A. Digital camera 300 stores images on a digital storage medium, such as a memory card 300 as shown in FIG. 1 which can be displayed on a color LCD image display 332. A digital printer 400, shown in detail FIGS. 2 and 3B, produces color hardcopy prints using a color marking apparatus 412, such as an ink jet head, and a paper transport mechanism 410. Digital printer 400 includes a camera interface 422, such as a USB interface, for transferring images from the digital camera 300 and controlling the images displayed on the camera color LCD image display 332. As illustrated in FIG. 2, digital printer 400 incorporates user controls 430 for selecting specific images to be printed from the plurality of digital images stored on memory card 330 within digital camera 300. The user controls 430 on the digital printer 400 are specifically arranged to provide easy control of the printer 400, since they do not need to be miniaturized in order to fit on a small portable digital camera, such as camera 300.

Referring now to FIG. 1 in detail, FIG. 1 is a block diagram showing electronic camera 300 that captures and stores digital images on a digital storage medium, such as memory card 330. FIG. 3A depicts a rear view of the appearance of electronic camera 300. Electronic camera 300 includes a zoom lens 312 having zoom and focus motor drives 310 and an adjustable aperture and shutter (not shown). The user composes the image using optical viewfinder 311 and zoom lens control switch 372 shown in FIG. 3A. Zoom lens 312 focuses light from a scene (not shown) on an image sensor 314, for example, a single-chip color CCD image sensor, using the well-known Bayer color filter pattern. Image sensor 314 is controlled by clock drivers 306. Zoom and focus motors 310 and clock drivers 306 are controlled by control signals supplied by a control processor and timing generator circuit 304. When the user depresses shutter button 374 (FIG. 3A) to take a picture, control processor and timing generator 304 receives inputs from autofocus and autoexposure detectors 308 and controls a flash 302. The analog output signal from image sensor 314 is amplified and converted to digital data by analog signal processing (ASP) and analog-to-digital (A/D) converter circuit 316. The digital data is stored in a DRAM buffer memory 318 and subsequently processed by a camera processor 320 controlled by the firmware stored in a firmware memory 328, which can be flash EPROM memory.

The processed digital image file is provided to a camera memory card interface 324 which stores the digital image file on memory card 330. Removable memory cards 330 which are described as an example in the present specification are known to those skilled in the art, and are one type of digital storage media. The memory card 330 can conform to the Compact Flash interface standard, such as described in the *CompactFlash Specification Version* 1.3, published by the CompactFlash Association, Palo Alto, Calif., Aug. 5, 1998. The removable memory card can alternately conform to the PCMCIA, Smart Media, Memory Stick, or SD memory card formats. The present invention is not limited to memory cards and it is noted that other types of digital storage media, such as magnetic hard drives, magnetic tape, or optical disks, can alternatively be used to store the digital images.

Processor 320 performs color interpolation followed by color and tone correction, in order to produce rendered sRGB image data as defined in IEC 61966-2-1 *Multimedia systems and equipment—Colour measurement and management—Part* 2-1: *Colour management—Default RGB colour space—sRGB* available from the International Electrotechnical Commission, Geneva, Switzerland. The rendered sRGB image data is then JPEG compressed and stored as a JPEG image file on memory card 330 using an JPEG/Exif version 2.1 image file as defined in *Digital Still Camera Image File Format Standard (Exchangeable Image File Format for Digital Still Camera: Exif)*, version 2.1, JEIDA-49-1998 available from the Japan Electronic Industry Development Association, Tokyo, Japan. The JPEG/Exif image files can be utilized by many different image capable devices, such as computers and stand-alone printers.

Processor 320 also creates a "thumbnail" size image, as described in commonly assigned U.S. Pat. No. 5,164,831 "Electronic still camera providing multi-format storage of full and reduced resolution images" to Kuchta et al.,. The thumbnail image is stored in RAM memory 326 and supplied to a color LCD image display 332, which displays the captured image for the user to review. User controls 303 and the text, icons, and images displayed on the display 332 provide the camera graphical user interface (camera GUI). As shown in FIG. 3A, the user controls 303 include a number of miniaturized buttons, 380, 382, 394, 396, 398 and a capture/review mode switch 386. These controls must be small in order to fit on the back of camera 300, and arranged so that they do not get in the way during the picture taking operations. After a series of images have been taken by placing mode switch 386 in the capture position, and then repeatedly depressing shutter button 374, mode switch 386 may be placed in the review position so that the captured images can be reviewed on color LCD image display 332.

When the camera is operated independently of the printer, the camera graphical user interface is controlled by the user interface portion of the firmware stored in firmware memory 328, which controls how the processor 320 responds to user controls 303 and creates the information displayed on display 332. Display 332 can be an active matrix color LCD display. Alternately, it can use other display technologies, such as organic light emitting diodes (OLEDs). Electronic camera 300 can also include a video output driver and connector (not shown) for displaying the captured images on a TV (not shown). Camera 300 may include firmware stored in firmware memory 328 to control image processor 320 to allow the user to create an image utilization file (such as a Digital Print Order Format (DPOF) file) to indicate what images are to be printed. Such a utilization file is described in commonly-assigned U.S. patent application Ser. No. 08/977,382, filed Nov. 24, 1997 to Parulski. This image utilization file is stored on memory card 330 along with the image files.

Figure 3B:
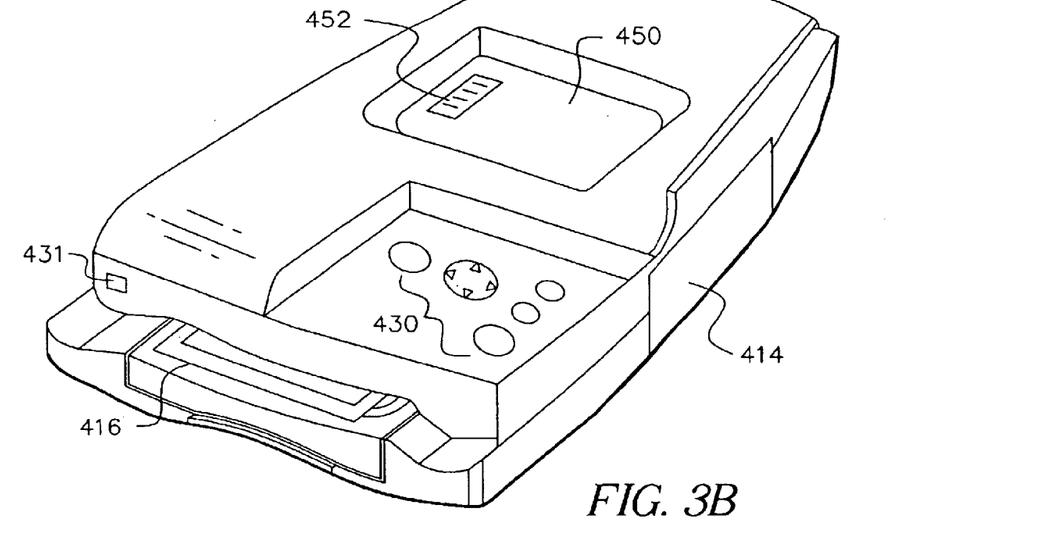
FIG. 3B depicts a perspective view of a first embodiment of a digital printer.

After a series of images have been taken and stored on memory card 330, the camera 300 is inserted into a recess 451 in the top surface of the housing of digital printer 400 shown in FIG. 3B. The printer 400 and specifically the recess 451 includes a connector 452 which mates with a connector 352 in digital camera 300 (FIGS. 1 and 2) in order to electrically interconnect printer interface 322 in digital camera 300 to camera interface 422 in digital printer 400. The electrical interface 342 between electronic camera 300 and digital printer 400 may use any well-known interface, such as the universal serial bus (USB) interface specification, the IEEE 1394 interface specification, or other cable interface or card interface specifications.

FIG. 2 is a block diagram of digital printer 400. FIG. 3B depicts the appearance of digital printer 400. Digital printer 400 produces digital prints (not shown) from images provided on memory card 330 via interface 342 from electronic camera 300. Digital printer 400 includes a media transport mechanism 410, such as a motor-driven roller, for moving hard copy media (e.g., ink jet paper) past a marking apparatus 412 (e.g., a color ink jet head) under the control of a printer processor 420. Processor 420 controls the marking apparatus 412 to provide controlled amounts of various color inks or dyes in order to produce a pictorial image on the hardcopy media. Color marking apparatus 412 may alternately use color thermal dye sublimation, color electrophotographic, or color instant technologies to produce the digital prints. As shown in FIG. 3B, digital printer 400 includes a paper exit slot 416 where the print can be ejected from digital printer 400, and an access door 414 which can be opened to replace the inks or dyes (e.g. to replace the color ink jet cartridge). Printer 400 also includes a power switch 431 for turning on and off power to printer 400 provided by a power cord input (not shown).

Digital printer 400 is controlled by printer user controls 430. User controls 430 and the text, icons, and images displayed on the color LCD image display 332 of digital camera 300 provide the printer graphical user interface (printer GUI). The printer GUI is controlled by the user interface portion of the firmware stored in printer firmware memory 428, which controls how processor 420 responds to user controls 430 and the color LCD image display control portion of the firmware stored in camera firmware memory 328, which controls how image processor 320 creates the information displayed on color LCD image display 332.

Since the image files created by electronic camera 300 use the JPEG/Exif image format, they are JPEG compressed and must be decompressed by processor 420 in digital printer 400. Processor 420 also provides interpolation, sharpening, color correction, and half-toning to prepare the image data properly to be used by the marking apparatus 412. Processor 420 is controlled by firmware stored in firmware memory 428. Alternatively, the processing can be provided by image processor 320 in camera 300, in order to reduce the required performance and cost of processor 420 in digital printer 400.

To quickly allow the images stored on memory card 330 to be displayed on color LCD image display 332, image processor 320 downloads the "thumbnail" size images from the images provided on memory card 330. These thumbnail images are stored in RAM memory 326 and supplied to display 332, so that the user can select the images to be printed using user controls 430 on printer 400. The user controls 430 on the digital printer 400 are much larger that those on digital camera 300, since the digital printer 400 does not need to be a hand-held device. Furthermore, the user controls 430 can be arranged and labeled in order to be very easy to use.

Figure 4:
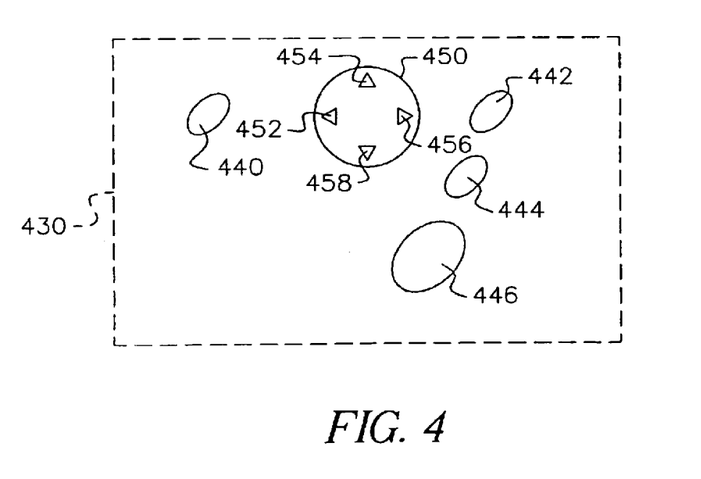
FIG. 4 depicts the printer graphical user interface.

FIG. 4 depicts the printer user controls 430 in more detail. User controls 430 include menu button 440, select button 442, view/return button 444, print button 446 and cursor button 450 having left arrow button 452, up arrow button 454, right arrow button 456, and down arrow button 458. Printer user controls 430 and color LCD image display 332 provide the printer graphical user interface (printer GUI).

Camera 300 can be further adapted to communicate with a network service provider 1000 (FIG. 2), such as the internet, by way of a modem 1001, to permit the electronic transfer of images to the camera; or camera 300 can be adapted to communicate with a computer via a PC interface 2000 to receive images from a personal computer. With these arrangements a user can load images from the internet or from a computer to the camera. With the camera connected to printer 400, the user can then use user control 430 on printer 400 to manipulate the loaded images while they are being displayed on image display 332 of the camera. As an alternative, the connection to the modem or computer can be through the printer.

Figure 5:
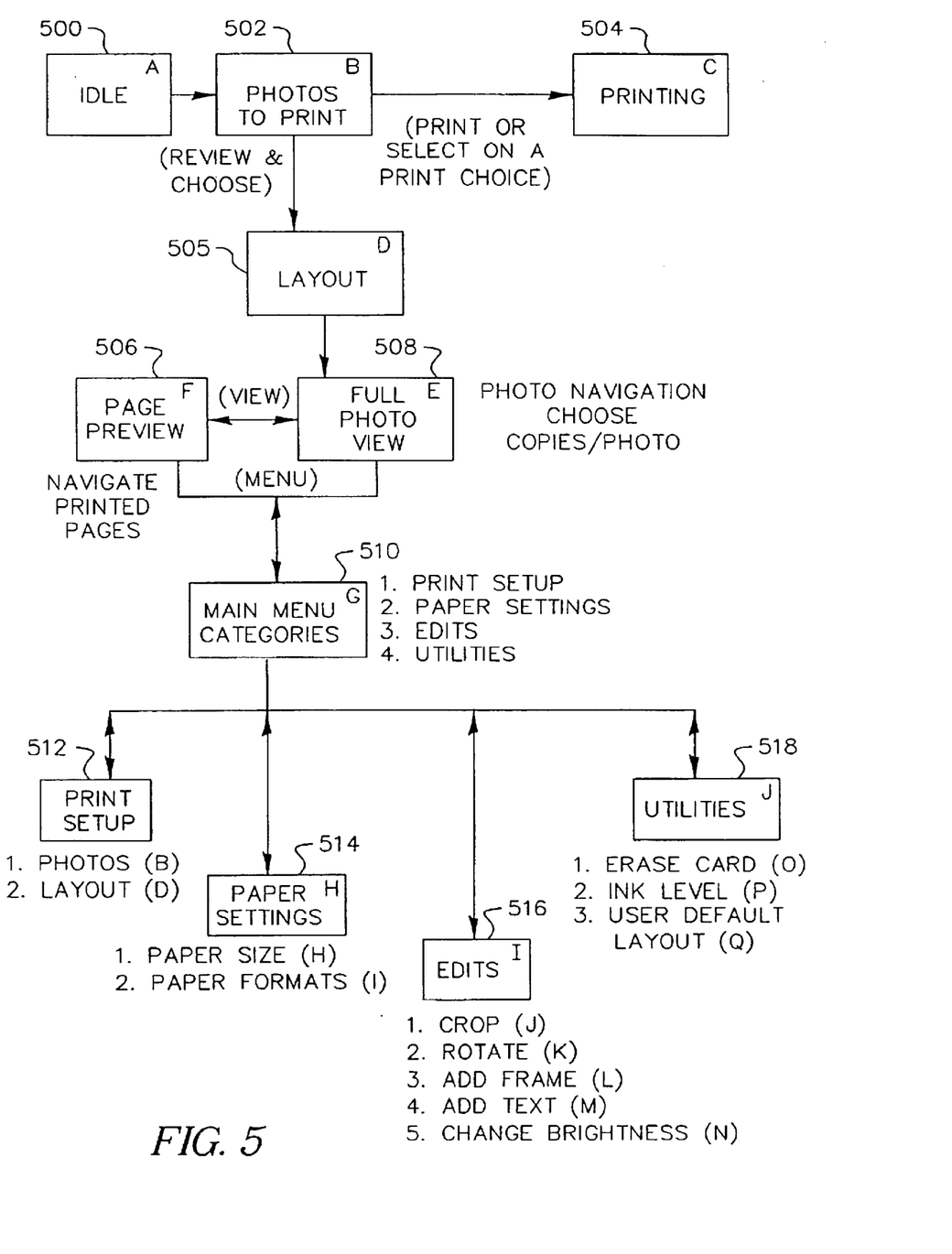
FIG. 5 depicts a flow diagram of a typical user interaction scenario.

The printer GUI is used to control printer 400 to implement the general workflow depicted in FIG. 5. The workflow includes numerous printer modes 500–518 which utilize various printer GUI screens shown in FIG. 6A–FIG. 6J, which are displayed on the color LCD image display 332 of digital camera 300. The modes include an Idle mode 500 that uses the printer GUI screen shown in FIG. 6A, a Photos to Print mode 502 that uses the printer GUI screen shown in FIG. 6B, a Printing in Process mode 504 that uses the printer GUI screen shown in FIG. 6C, and a Layout mode 505 that uses the printer GUI screen shown in FIG. 6D. The modes also include a Full Photo View mode 508 that uses the printer GUI screen shown in FIG. 6E, a Page Preview mode 506 that uses the printer GUI screen shown in FIG. 6F, and a Main Menu Categories mode 510 that uses the printer GUI screen shown in FIG. 6G.

Figure 6A:
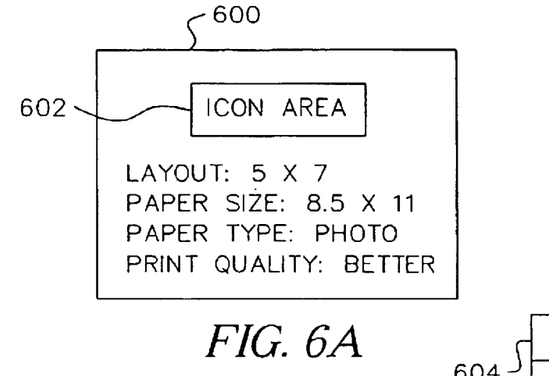
FIGS. 6A to 6L, 6L', 6M, 6M' and 6N–6Q depict graphical user interface screens used as part of the printer graphical user interface.
Figure 6B:
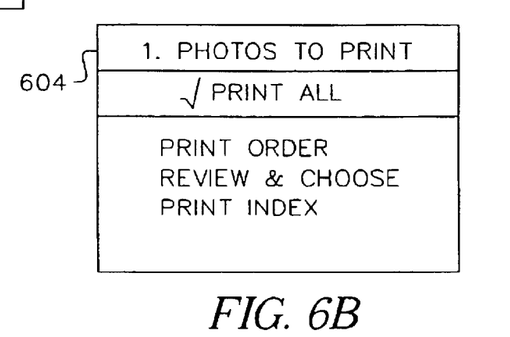
Figure 6C:
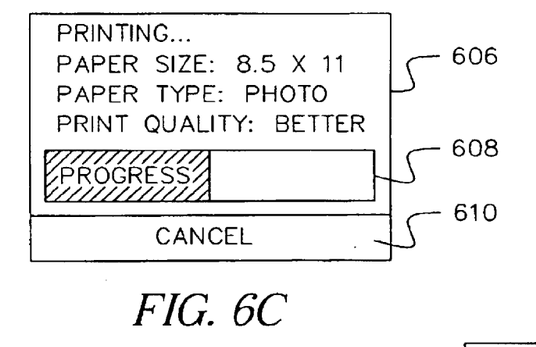
Figure 6D:
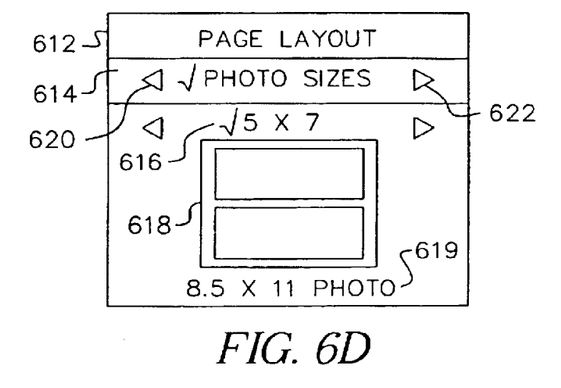

The modes also include Print Setup modes 512, including a Photos submode that uses the printer GUI screen shown in FIG. 6B and a Layout submode that uses the printer GUI screen shown in FIG. 6D. The modes also include Paper Settings modes 514, including a Paper Size submode that uses the printer GUI screen shown in FIG. 6H and a Paper Format submode that uses the printer GUI screen shown in FIG. 6I. The modes also include Edits modes 516, including a Crop submode that uses the printer GUI screen shown in FIG. 6J, a Rotate submode that uses the printer GUI screen shown in FIG. 6K, an Add Frame submode that uses the printer GUI screen shown in FIG. 6L, an add Text submode that uses the printer GUI screens shown in FIG. 6M, and a Change brightness submode that uses the printer GUI screen shown in FIG. 6N. The modes also include Utilities modes 518, including an Erase card submode that uses the printer GUI screen shown in FIG. 6-O, an Ink Level submode that uses the printer GUI screen shown in FIG. 6P, and a User Default Layout submode that uses the printer GUI screen shown in FIG. 6Q.

Menu button 440 as shown in FIG. 4 toggles to and from Main Menu Categories mode 510 from the Page Preview mode 506 or the Full Photo View mode 508. Select button 442 is used in Full Photo View mode 508 to toggle images to be printed on and off in order to select specific images to be printed. In Menu modes 510, 512, 514, 516 and 518, select button 442 allows the user to enter a submenu or accept menu settings. View/return button 444 is used to switch modes between Page Preview mode 506 and Full Photo View mode 508. In Menu modes 510, 512, 514, 516 and 518, View/return button 444 allows the user to return to a previous menu level without retaining any changed settings.

Print button 446 initiates the print procedure. If there is no memory card 330 attached to memory card interface 324 of digital camera 300, or if the digital camera 300 is not connected to the digital printer 400 using interface 342, pressing print button 446 initiates a test print. If there is a memory card 330 in digital camera 300, and the digital camera 300 is connected to digital printer 400 using interface 342, depressing print button 446 initiates the print using the current printer settings.

Figure 6E:
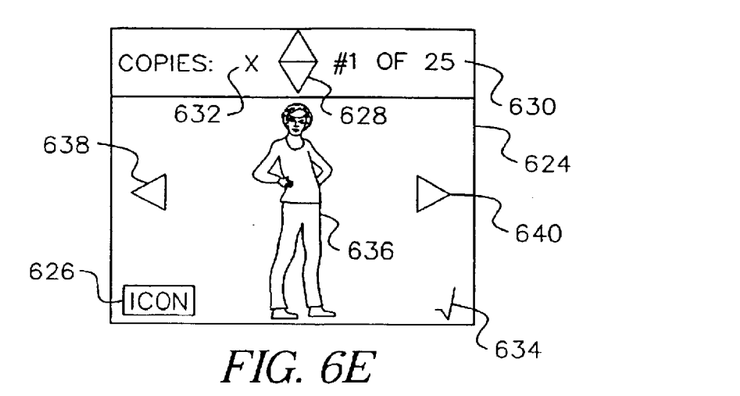

In Full Photo View mode 508 corresponding to the display screen shown in FIG. 6E, cursor left arrow 452 and cursor right arrow 456 allow the user to navigate photos, and cursor up arrow 454 and down arrow 458 allow the user to select the number of copies per image. In Page Preview mode 506 corresponding to the display screen in FIG. 6F, cursor left arrow 452 and cursor right arrow 456 allows the user to navigate the pages. In Menu modes 510, 512, 514, 516 and 518, the cursor buttons 450 are used for menu navigation.

Turning now to FIG. 6A, idle screen 600 is used to provide pertinent information on the current printer parameter settings. These parameters include the layout, paper size, paper type, and print quality. The user-defined default setting (to be described later in relation to FIG. 6Q) is used, unless the user overrides this default setting by making other selections. Idle screen 600 allows the user to immediately understand the settings that will be used if the user immediately presses print button 446 in FIG. 4. This is beneficial because the user may not have used the printer for some time, and may have forgotten the printer parameter settings. If the settings are appropriate, the user may insert removable memory card 330 into digital camera 300 and immediately make prints without further interactions with the printer GUI. The idle screen also displays an icon 602 representing the printer, to provide immediate identification that this is not a parameter setting screen such as the parameter settings screens depicted in FIGS. 6B–6N.

FIG. 6B depicts the first start-up GUI screen 604, which is displayed on color LCD image display 332 when the user inserts memory card 330 into the memory card interface 324. GUI screen 604 provides a simple method for printing either all of the images stored on memory card 330 using the "Print All" option or printing the images specified in an image utilization file stored along with the images on memory card 330 using the "Print Order" option. The user can also use the "Print Index" option to make an index print including small versions of all of the images stored on memory card 330. In all three cases, processor 420 in digital printer 400 instructs processor 320 in digital camera 300 to update the printer GUI screen shown on color image display 332 of digital camera 300 to provide GUI screen 606 shown in FIG. 6C. Finally, the user can select the "Review and Choose" option in FIG. 6B to choose particular images to be printed. In this case, processor 420 in digital printer 400 instructs processor 320 in digital camera 300 to update the printer GUI screen shown on color image display 332 of digital camera 300 to provide GUI screen 606 shown in FIG. 6D.

FIG. 6C depicts a "Printing in Process" GUI screen 606. This screen lists the parameter settings that are being used to print the images. It also includes a progress bar 608 that graphically indicates the percentage of the pages that have so far been printed. Finally, the GUI screen 606 includes a "Cancel" option 610 that will abort the printing process when selected by the user.

FIG. 6D depicts a Layout startup screen 612. This allows the user to choose exactly how the pictures will be laid out on the printed pages. The user can use the up button 454 and down button 458 of cursor 450 to select option 614 or 616. The General Category option 614 represents a general category of print formats. If arrows 620 and 622 are visible, the user can use the cursor right arrow 456 and left arrow 452 in FIG. 4 to view other allowed print format settings. These print formats include general Photo Sizes (e.g. 8"×10" and 4"×6" size images) as well as specific formatted media identifiers (e.g. defined template numbers) that indicate specific paper size and layout details, such as the location of perforations if the paper is perforated. The firmware memory 428 in printer 400 stores the paper size and layout information for each media identifier, to simplify the use of such media by the user. The specific options listed in option list 616 provide specific options that may be utilized for the General Category 614 chosen by the user, such as allowed photo sizes (e.g. 5 "×7", 4"×6", etc.). Underneath the specific option list 616 is a graphical representation 618 of the currently selected layout and the current paper size and type settings 619. For example, graphical representation 618 indicates that two 5"×7" images will be printed on an 8.5"×11" size paper.

After the user chooses his/her preferred layout using GUI screen 612 in FIG. 6D and presses the Select button 442, processor 320 in digital printer 400 instructs processor 320 in digital camera 300 to update the printer GUI screen shown on color image display 332 of digital camera 300 to provide GUI screen 606 shown in FIG. 6E. The top of the screen 624 provides pertinent information including picture number 630 and copies 632 which is overlayed on a thumbnail image depicting the specific picture 636. The left arrow 638 and right arrow 640 located at the edges of the screen indicate to the user that they can view other images by depressing the left arrow 452 and right arrow 456 of the cursor 450 in FIG. 4 in order to scroll to other digital images stored on removable memory 330. Checkmark 634 indicates whether or not image 636 has been selected for printing. By depressing Select button 442, the user can toggle between printing or not printing the specific image 636. Arrows 628 indicate to the user that they can change the numbers of prints for the specific image 636 by depressing the up arrow 454 and down arrow 458 of cursor 450 in FIG. 4. If image 636 has been edited by the user (as will be described later in relation to FIGS. 6J–N), icon 626 is made visible in GUI screen 624. When the user presses View/Return button 444, processor 420 in digital printer 300 instructs processor 320 in digital camera 300 to update the printer GUI screen shown on color image display 332 of digital camera 300 to provide GUI screen 606 shown in FIG. 6F.

Figure 6F:
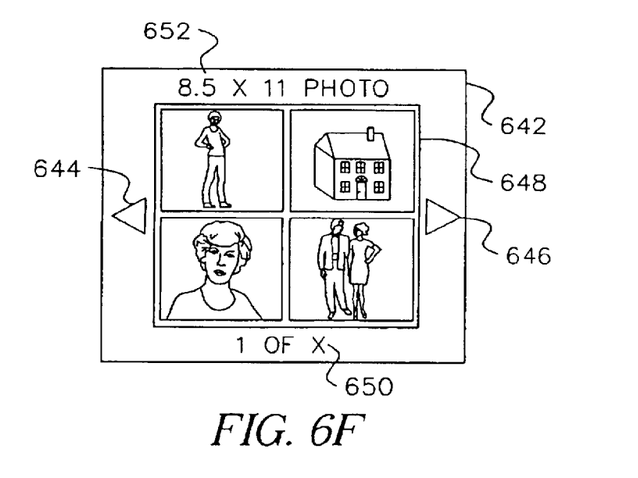

FIG. 6F depicts a Page Preview GUI screen 642, to allow the user to view the appearance of the entire print. A single page 648 is represented on GUI screen 642, and may contain multiple images, such as the four different images shown in page 648. The left arrows 644 and right arrow 646 indicate to the user that they can view other pages by depressing the left arrow 452 and right arrow 456 of the cursor 450 in FIG. 4. The paper size and type 652 and the current and total number of different pages to be printed 650 are also displayed in GUI screen 642.

Figure 6G:
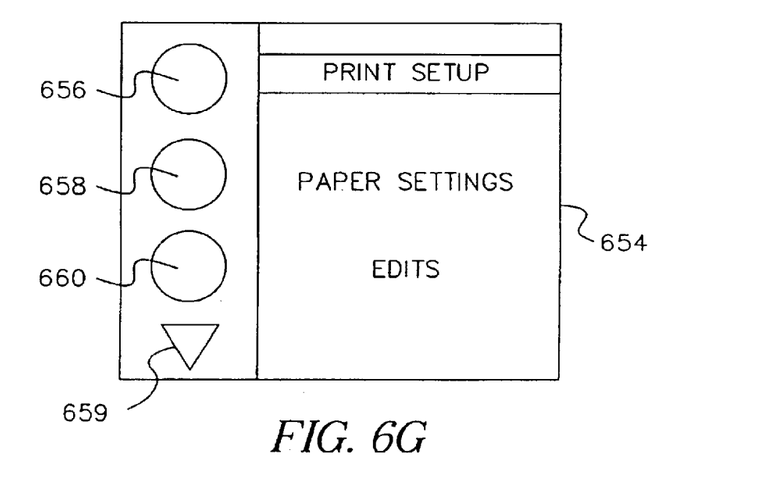

When the user presses the menu button 440 in FIG. 4, processor 420 in digital printer 400 instructs processor 320 in digital camera 300 to update the printer GUI screen shown on color image display 332 of digital camera 300 to provide GUI screen 606 shown in FIG. 6G. Icons 656, 658, and 660 depict general menu categories. For example, icon 656 represents the Print Setup category mode 512 in FIG. 5, icon 658 represents the Paper Settings category mode 514 in FIG. 5, and icon 660 represents the Edits category mode 516 in FIG. 5. Once a general menu category has been selected (e.g. Print Setup category mode 512 in FIG. 5) the user can select specific submenu options relevant to that category (e.g. Photos or Layout). FIG. 5 lists the main menu categories and the submenu options. Arrow key 659 indicates to the user that they can select a different general menu category (e.g. Utilities Category mode 518) by depressing the down arrow 458 of the cursor 450 in FIG. 4

Figure 6H:
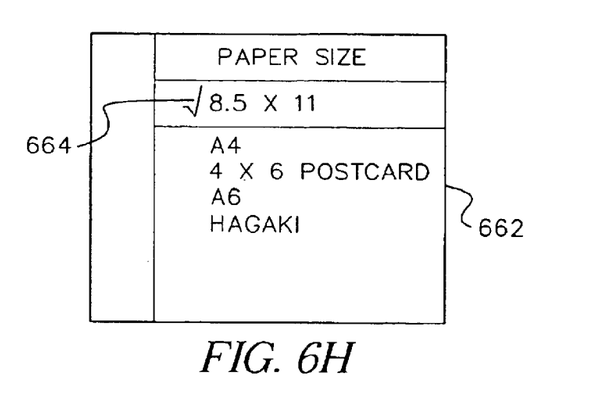

When the user selects the Paper Size submenu, processor 420 in digital printer 400 instructs processor 320 in digital camera 300 to update the printer GUI screen shown on color image display 332 of digital camera 300 to provide GUI screen 606 shown in FIG. 6H. A check mark 664 indicates the current paper size setting. The user can select a different paper size by using the up arrow 454 and down arrow 458 in FIG. 4 to highlight a different paper size. By then pressing the select button 442, the user can select the newly highlighted paper size to change paper size settings. The processor 420 then stores the newly selected paper size setting in firmware memory 428 of digital printer 400, and instructs image processor 320 in digital camera 300 to update the GUI shown on color image display 332 to the Paper Settings Submenu (not shown). If the user instead presses the View/Return button 444, the user can exit the Paper Size submenu, and processor 420 will not modify the current setting stored in firmware memory 428.

Figure 6I:
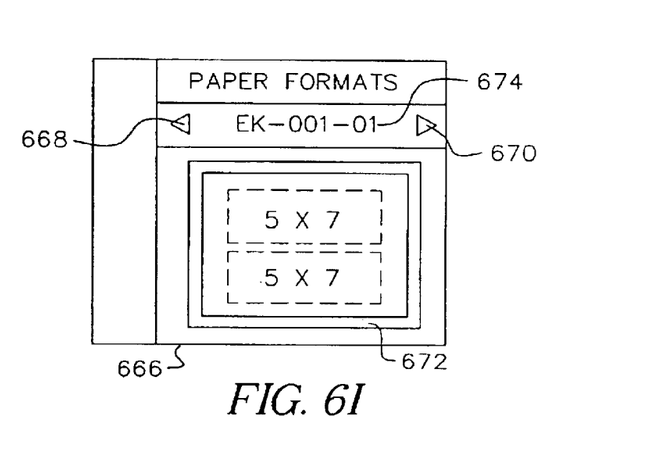

When the user selects the Paper Format submenu, processor 420 in digital printer 400 instructs processor 320 in digital camera 300 to update the printer GUI screen shown on color image display 332 of digital camera 300 to provide GUI screen 606 shown in FIG. 6I. GUI screen 666 indicates the currently selected media identifier 674. The left arrow 668 and right arrow 670 indicate to the user that they can view other media options by depressing the left arrow 452 and right arrow 456 of the cursor 450 in FIG. 4. The GUI screen 666 also includes graphical representation 672 of the currently selected media. This allows the user to easily visualize important aspects of the currently selected media. For example, if the currently selected media provides two perforated 5"×7" prints on a single 8.5"×11" size sheet of paper, the user can recognize this by viewing graphical representation 672 corresponding to the selected media identifier 674.

Figure 6J:
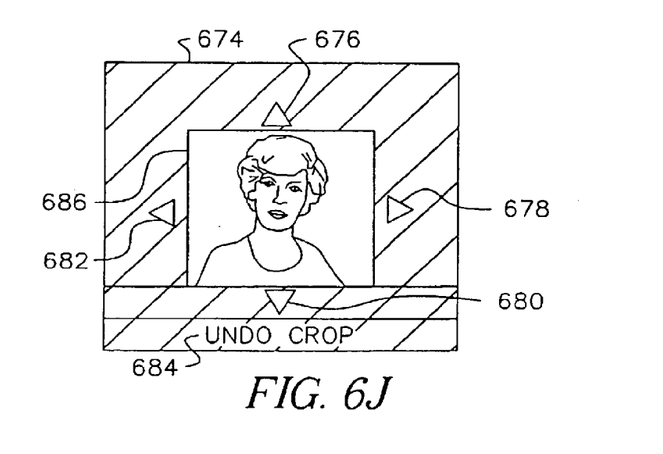

When the user selects the Crop submenu, processor 420 in digital printer 400 instructs processor 320 in digital camera 300 to update the printer GUI screen shown on color image display 332 of digital camera 300 to provide GUI screen 606 shown in FIG. 6J. A thumbnail view of a cropped portion of the current image read from memory card 330 is displayed within crop window 686. The image area outside crop window 686 has a darkened appearance, indicating that this area of the image will not be printed. Arrows 676, 678, 680, and 682 indicate to the user that they can modify the position of the crop window by using cursor 450 to change the area of the image that will be printed. If an image has been previously cropped, the cropping can be undone using the Undo Crop option 684. If the image has not been previously cropped, the Undo Crop option 684 is not displayed in GUI screen 674. When the user presses the select button 442, the processor 420 stores the crop settings for the current image in firmware memory 428. These stored settings will be used when the image is printed.

Figure 6K:
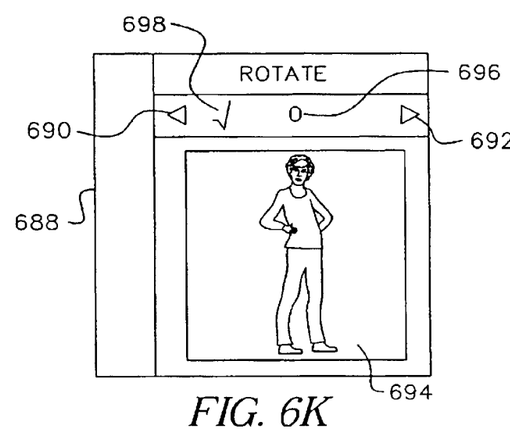

When the user selects the Rotate submenu, processor 420 in digital printer 400 instructs processor 320 in digital camera 300 to update the printer GUI screen shown on color image display 332 of digital camera 300 to provide GUI screen 606 shown in FIG. 6K. A thumbnail view of the current image read from memory card 330 is displayed in window 694. The left arrow 690 and right arrow 692 indicate to the user that they can selectively rotate the image by 90 degree increments by depressing the left arrow 452 and right arrow 456 of the cursor 450 in FIG. 4. The currently selected rotation setting 696 is indicated by a checkmark 698. When the user selects a different setting, the orientation of the image within window 694 is also rotated, so that the user can immediately preview the results of applying the rotation setting. By using the thumbnail image data stored within the image file on removable memory 330, processor 320 within digital camera 300 can quickly modify the thumbnail image and provide an immediate visual response in window 694 to the user's selection, so that the user can quickly confirm that they have made an appropriate selection. When the user presses select button 442, processor 420 stores the orientation setting for the current image in firmware memory 328. This stored setting will be used when the image is printed.

Figure 6L:
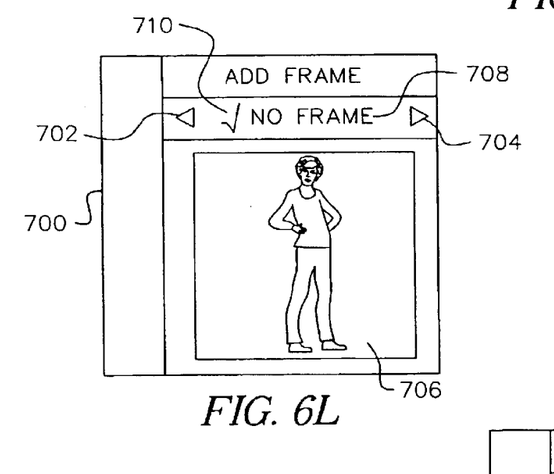

When the user selects the Add Frame submenu, processor 420 in digital printer 400 instructs processor 320 in digital camera 300 to update the printer GUI screen shown on color image display 332 of digital camera 300 to provide GUI screen 606 shown in FIG. 6L. A thumbnail view of the current image read from memory card 330 is displayed in window 706. The left arrow 702 and right arrow 704 indicate to the user that they can select various decorative frames by depressing the left arrow 452 and right arrow 456 of the cursor 450 in FIG. 4. The currently selected frame setting 708 is indicated by a checkmark 710. For example, GUI screen 700 shows that no frame has been selected. When the user selects a different frame option, the image shown within window 706 is updated to depict the current image within the selected frame. For example, GUI screen 712 in FIG. 6L' indicates that a Circle frame has been selected. The frame options can be stored in firmware memory 428 in digital printer 400, firmware memory 328 in digital camera 300, or in memory card 330. Alternatively, it can be downloaded from memory card 330 to firmware memory 328 in digital camera 300 or firmware memory 428 in digital printer 400 using the methods described in commonly-assigned U.S. Pat. No. 5,477,264, Dec. 19, 1995, "Electronic imaging system using a removable software-enhanced storage device" to Sarbadhikari et. al., the disclosure of which is hereby incorporated by reference. By using the thumbnail image data stored within the image file on removable memory 330 as well as a thumbnail image of the decorative frame, processor 320 within digital camera 300 can quickly combine the current image and currently selected frame to provide an immediate visual response in window 706 to the user's selection, so that the user can quickly confirm that they have made an appropriate selection. When the user presses the select button 442 in FIG. 4, processor 420 stores the frame setting for the current image in firmware memory 428 in FIG. 2. This stored setting will be used when the image is printed.

Figure 6M:
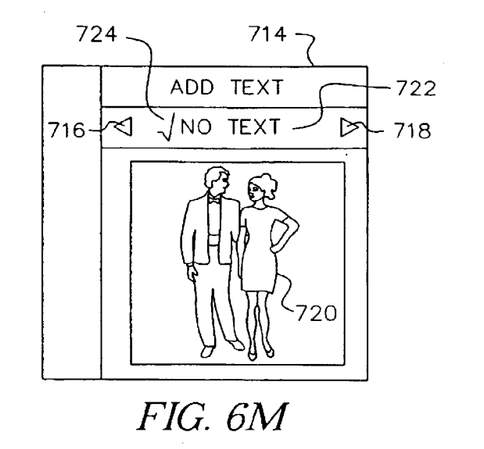

When the user selects the Add Text submenu, processor 420 in digital printer 400 instructs processor 320 in digital camera 300 to update the printer GUI screen shown on color image display 332 of digital camera 300 to provide GUI screen 606 shown in FIG. 6M. A thumbnail view of the current image read from memory card 330 is displayed in window 720. The left arrow 716 and right arrow 718 indicate to the user that they can select various text messages by depressing the left arrow 452 and right arrow 456 of the cursor 450 in FIG. 4. The currently selected text message setting 722 is indicated by a checkmark 724. For example, GUI screen 714 shows that no text has been selected. When the user selects a different text option, the image shown within window 720 is updated to depict the current image overlaid by the selected text. For example, GUI screen 726 in FIG. 6M' indicates that a text message "Anniversary" has been selected. Various text messages can be stored as text files within firmware memory 428 in digital printer 400, firmware memory 328 in digital camera 300, or on memory card 330. By using the thumbnail image data stored within the image file on memory card 330, processor 420 within printer 400 can quickly combine the current image and currently selected text message to provide an immediate visual response in window 720 to the user's selection, so that the user can quickly confirm that they have made an appropriate selection. When the user presses select button 442, processor 420 stores the text setting for the current image in firmware memory 428. This stored setting will be used when the image is printed.

Figure 6N:
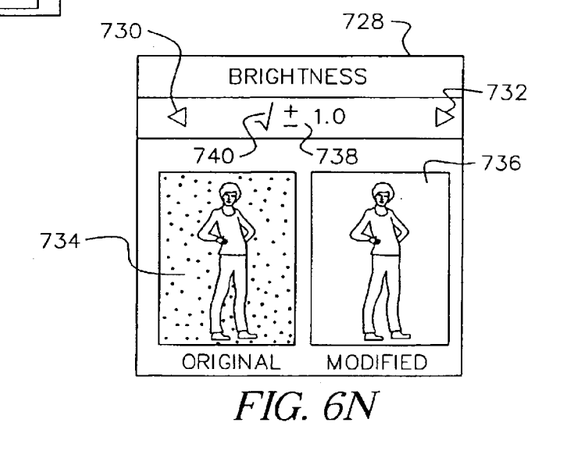
Figure 6O:
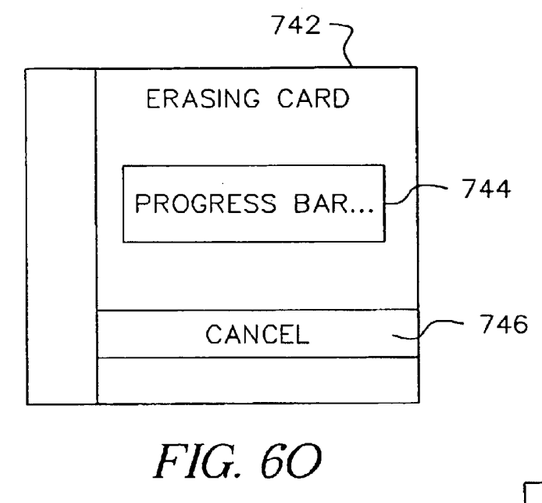

When the user selects the Change Brightness submenu, processor 420 in digital printer 400 instructs processor 320 in digital camera 300 to update the printer GUI screen shown on color image display 332 of digital camera 300 to provide GUI screen 728 shown in FIG. 6N. A small thumbnail view of the current image read from memory card 330 is displayed in window 734. A second window 736 depicts a brightness-adjusted version of the same digital image. The left arrow 730 and right arrow 732 indicate to the user that they can select brightness settings by depressing the left arrow 452 and right arrow 456 of the cursor 450 in FIG. 4.

The currently selected brightness setting 738 is indicated by a checkmark 740. When the user selects various brightness settings, the image shown within window 736 is updated to depict the modified image, using the methods described in commonly-assigned U.S. patent application Ser. No. 09/315, 647 filed May 20, 1999, "Correcting Exposure in a Rendered Digital Image", to Gilman, et. al. By using the thumbnail image data stored within the image file on memory card 330, processor 420 within printer 400 can quickly modify the image to provide an immediate visual response in window 736 to the user's selection, so that the user can quickly confirm that they have made an appropriate selection. When the user presses the select button 442, the processor 420 stores the brightness setting for the current image in firmware memory 428. This stored setting will be used when the image is printed.

When the user selects the Erase Card submenu, processor 420 in digital printer 400 instructs processor 320 in digital camera 300 to update the printer GUI screen shown on color image display 332 of digital camera 300 to provide GUI screen 742 shown in FIG. 6-O. When the user confirms that they want to erase all of the images from memory card 330, a progress bar 744 indicates how much progress has been made in erasing the images. A cancel bar 746 can be selected to abort the process of erasing memory card 330.

Figure 6P:
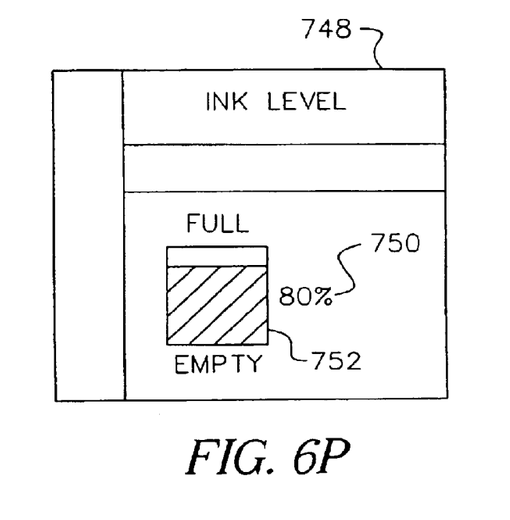

When the user selects the Ink Level submenu, processor 420 in digital printer 400 instructs processor 320 in digital camera 300 to update the printer GUI screen shown on color image display 332 of digital camera 300 to provide GUI screen 748 shown in FIG. 6P. GUI screen 748 includes a graphic representation 752 and numeric value 750 indicating the approximate level of ink remaining in the cartridge within marking apparatus 412 of digital printer 400. The user can return to the Utilities submenu (not shown) by pressing the Select button 442 or the View/Return button 444 in FIG. 4.

Figure 6Q:
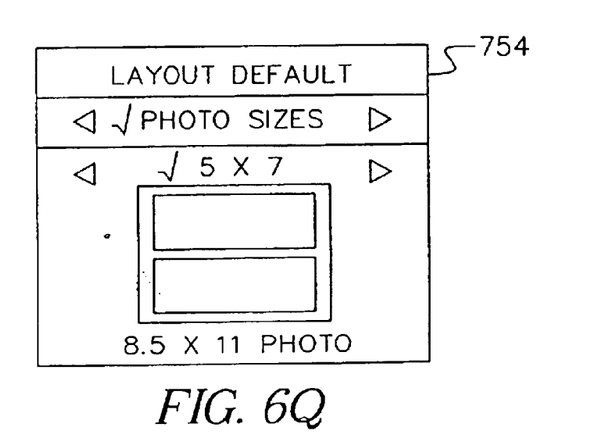

When the user selects the User Default Layout submenu, processor 420 in digital printer 400 instructs processor 320 in digital camera 300 to update the printer GUI screen shown on color image display 332 of digital camera 300 to provide GUI screen 754 shown in FIG. 6Q. Using a process similar to that described in relation to FIG. 6D, the user can select a preferred layout. This layout is then used as the default the next time the printer is used, as described earlier in relation to FIG. 6A. When the user presses the select button 442, processor 420 stores the user default setting in firmware memory 428.

The firmware code stored in firmware memory 428 can be customized to suit the needs of a particular user, as described in commonly-assigned U.S. patent application Ser. No. 09/534,469, entitled "Configuring and Purchasing Imaging Devices" to Parulski. Either the memory card 330 or the camera interface 422 can be used to upload the customized firmware to the firmware memory 428 from a separate computer (not shown). The configured firmware stored in firmware memory 428 can include personal digital data, for example, the name, address, and favorite photo of the printer owner, or a greeting if the printer was given as a gift. This personal digital data can be displayed on the display 332 for a specified period (e.g., five seconds) when the digital printer 400 is turned on and connected to digital camera 300. This personal digital data can be used to determine the owner, in case the digital printer 400, which can be a small portable device, is lost or stolen.

Figure 7:
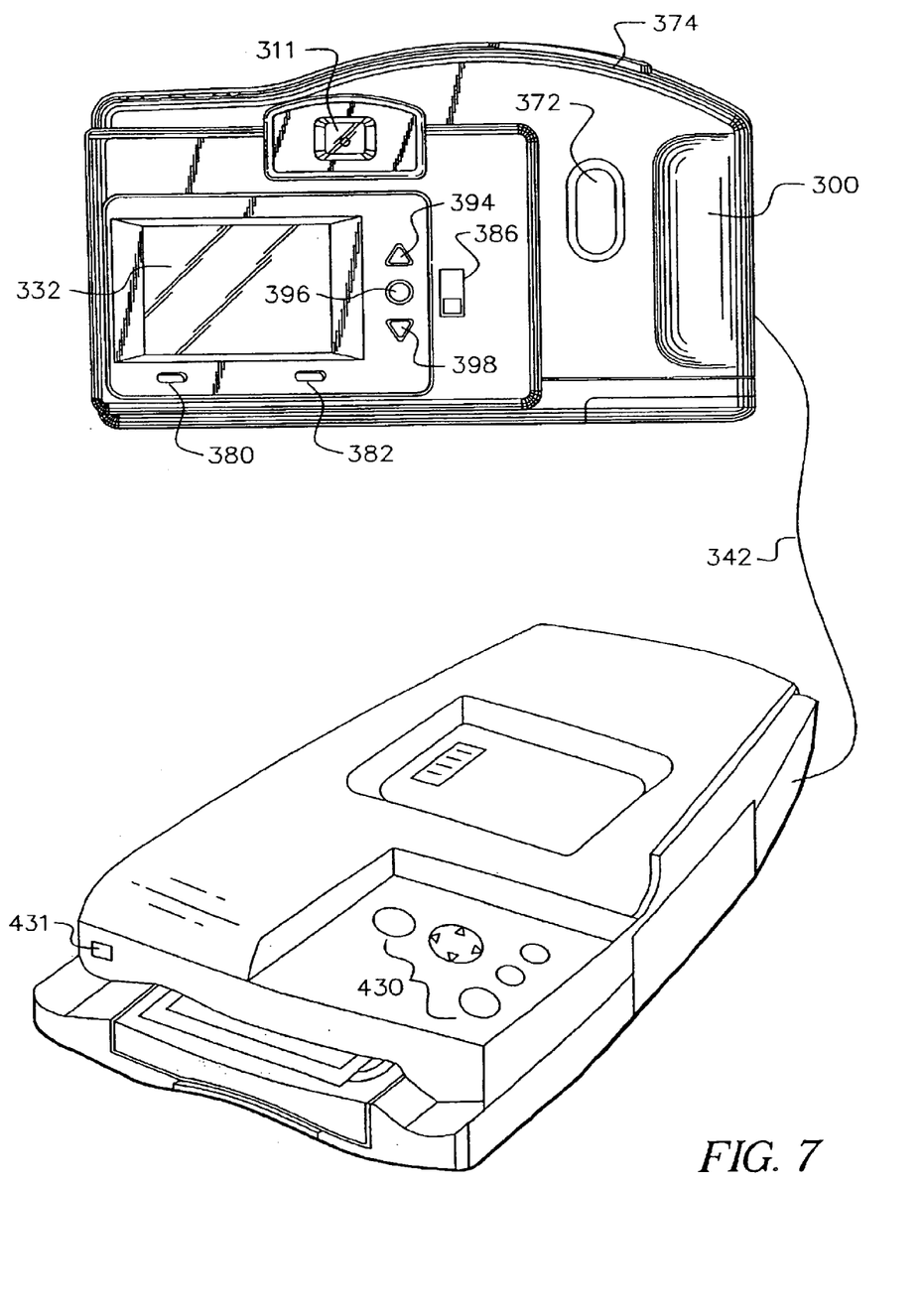
FIG. 7 depicts a second embodiment of a digital printer

In an alternative embodiment depicted in FIG. 7, digital printer 400 is attached to electronic camera 300 using connection 342 in the form of interface cable 342'. Interface cable 342' mates with a connector on electronic camera 300 to provide a connection between printer interface 322 of electronic camera 300 in FIG. 1 and camera interface 422 of digital printer 400 in FIG. 2. Digital printer 400 in FIG. 7 does not include a slot for holding digital camera 300.

The invention has been described in detail with particular reference to certain preferred embodiments thereof, but it will be understood that variations and modifications can be effected within the spirit and scope of the invention.

What is claimed is:

1. A digital photography system comprising:
   a digital camera for capturing images and a digital printer for producing hardcopy prints;
   the camera including:
   an image sensor for capturing images;
   a memory for storing a plurality of the captured images;
   an image display for displaying the stored images; and
   the printer including;
   a marking apparatus adapted to provide the images on a print;
   a firmware memory which is adapted to be customized to store a user selected default printer setting;
   user controls for controlling the printer and for selecting a preferred printer setting, wherein the preferred printer setting for the particular user is stored as the user-selected default setting in the firmware memory and wherein the default printer setting is displayed on the image display and used by the electronic printer unless the user overrides the default printer setting; and
   an electrical interface for controlling, from the printer, the images displayed on the display of the camera, for selecting an image to be printed from the plurality of digital images stored in the memory of the camera, and for transferring the selected image from the camera to the printer.

2. A system according to claim 1, wherein the marking apparatus of the printer is a color marking engine adapted to print the selected image to be printed on a hardcopy print using the default printer setting.

3. A system according to claim 2, wherein the printer further includes a processor which receives the transferred images from the electrical interface, said processor being adapted to control the color marking engine and the user controls and to store the default printer setting in the firmware memory.

4. A system according to claim 1, wherein said firmware memory is flash EPROM memory.

5. A system according to claim 1, wherein said electrical interface is a universal serial bus interface.

6. A system according to claim 3, wherein said camera further includes a connector which mates with a connector provided in a recess in said printer.

7. A system according to claim 1, wherein the user controls of the printer comprise menu buttons for processing and manipulating images viewed on the image display of the camera.

8. A system according to claim 1, wherein the user controls enable a selection of a preferred layout from a plurality of layouts, and the selected preferred layout is stored as a default layout setting in the firmware memory.

9. A system according to claim 8, wherein the default layout setting is displayed on the image display of the camera.

10. A system according to claim 8, wherein the layout selected for a particular image is stored in a digital memory in the printer prior to printing, and recalled for use during printing.

11. A system according to claim 1, wherein the user controls enable the selected image to be cropped prior to printing.

12. A system according to claim 11, wherein the cropped image is displayed on the image display prior to printing.

13. A system according to claim 12, wherein the images stored on the digital storage medium include thumbnail images, and the cropped image display is provided by cropping the thumbnail image.

14. A system according to claim 1, wherein the firmware memory stores personal digital data, and wherein the personal digital data is displayed on the image display.

15. A system according to claim 14, wherein the personal digital data is a favorite photo.

16. A system according to claim 15, wherein the favorite photo is displayed for a specified period when the printer is turned on.

17. A system according to claim 14, wherein the personal digital data is a name and address.

18. A system according to claim 1, wherein the user controls enable the selected image to be combined with a frame image prior to printing to form a combined image.

19. A system according to claim 18, wherein the combined image is displayed on the image display prior to printing.

20. A system according to claim 19, wherein the frame selected for the selected image is stored in a digital memory in the printer prior to printing, and recalled for use during printing.

21. A system according to claim 1, wherein the user controls enable the selected image to be overlayed with a text message prior to printing.

22. A system according to claim 21, wherein the overlayed image is displayed on the color image display prior to printing.

23. A system according to claim 21, wherein the text message selected for a particular image is stored in a digital memory in the printer prior to printing, and recalled for use during printing.

24. A system according to claim 1, wherein the user controls enable a brightness of the selected image to be modified.

25. A system according to claim 24, wherein the brightness modified image is displayed on the image display prior to printing.

26. A system according to claim 25, wherein a brightness setting selected for a particular image is stored in a digital memory in the printer prior to printing, and recalled for use during printing.

27. A system according to claim 1, wherein the marking apparatus includes a removable ink jet head.

28. A system according to claim 27, wherein the graphical user interface includes a graphical image depicting the amount of ink remaining in the ink jet head.

29. A system according to claim 1, wherein the user controls enable a printing of multiple copies of the selected image.

30. A system according to claim 1, wherein said camera is adapted to receive and store images from at least one of a network service provider or a computer for display on said image display.

* * * * *